US012645534B2

(12) United States Patent
Yeung et al.

(10) Patent No.: US 12,645,534 B2
(45) **Date of Patent: *Jun. 2, 2026**

(54) REDUNDANT ARRAY MANAGEMENT TECHNIQUES

(71) Applicant: Micron Technology, Inc., Boise, ID (US)

(72) Inventors: Chun Sum Yeung, San Jose, CA (US); Jonathan S. Parry, Boise, ID (US); Deping He, Boise, ID (US); Xiangang Luo, Fremont, CA (US); Reshmi Basu, Boise, ID (US)

(73) Assignee: Micron Technology, Inc., Bosie, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/890,418

(22) Filed: Sep. 19, 2024

(65) Prior Publication Data

US 2025/0086055 A1     Mar. 13, 2025

Related U.S. Application Data

(63) Continuation of application No. 17/648,395, filed on Jan. 19, 2022, now Pat. No. 12,111,724.

(Continued)

(51) Int. Cl.
*G06F 11/00* (2006.01)
*G06F 11/10* (2006.01)

(52) U.S. Cl.
CPC ...... *G06F 11/1068* (2013.01); *G06F 11/1076* (2013.01)

(58) Field of Classification Search
CPC ........................ G06F 11/1068; G06F 11/1076
See application file for complete search history.

(56) References Cited

U.S. PATENT DOCUMENTS 9,569,306 B1   2/2017   Camp et al.
11,138,071 B1   10/2021   Agarwal et al.
(Continued)

FOREIGN PATENT DOCUMENTS

CN     108028058 A     5/2018
CN     109426583 A     3/2019
CN     112445648 A     3/2021

OTHER PUBLICATIONS

European Patent Office, "European search report and Search Opinion", issued in connection with European Patent Application No. 22162489.3 dated Jul. 25, 2022 (14 pages).

(Continued)

*Primary Examiner* — Joshua P Lottich
(74) *Attorney, Agent, or Firm* — Holland & Hart LLP

(57) ABSTRACT

Methods, systems, and devices for redundant array management techniques are described. A memory system may include a volatile memory device, a non-volatile memory device, and one or more redundant arrays of independent nodes. The memory system may include a first redundant array controller and a second redundant array controller of a redundant array of independent nodes. The memory system may receive a write command associated with writing data to a type of memory cell. Based on the type of memory cell, the memory system may generate parity data corresponding to the data using one or both of the first redundant array controller and the second redundant array controller. In some examples, the first redundant array controller may be configured to generate parity data associated with a first type of failure and the second redundant array controller may be configured to generate parity data associated with a second type of failure.

20 Claims, 5 Drawing Sheets

Related U.S. Application Data

(60) Provisional application No. 63/162,141, filed on Mar. 17, 2021.

(56) References Cited

U.S. PATENT DOCUMENTS

| | | |
|---|---|---|
| 11,404,127 B1 | 8/2022 | Kumar et al. |
| 2008/0016430 A1 | 1/2008 | Yoshida |
| 2012/0192035 A1 | 7/2012 | Nakanishi |
| 2014/0115427 A1 | 4/2014 | Lu |
| 2014/0245097 A1 | 8/2014 | Larsen et al. |
| 2016/0132388 A1 | 5/2016 | Kim |
| 2017/0102993 A1 | 4/2017 | Hu et al. |
| 2018/0129430 A1 | 5/2018 | Kang et al. |
| 2019/0028283 A1 | 1/2019 | Sharifi et al. |
| 2019/0056994 A1 | 2/2019 | Shulkin et al. |
| 2019/0065306 A1 | 2/2019 | Margetts |
| 2019/0102249 A1 | 4/2019 | Bolkhovitin et al. |
| 2019/0121756 A1 | 4/2019 | Yang |
| 2019/0130982 A1 | 5/2019 | Reusswig et al. |
| 2019/0138390 A1 | 5/2019 | Fisher et al. |
| 2019/0332468 A1 | 10/2019 | Chaiken et al. |
| 2020/0210284 A1 | 7/2020 | Somasekhar et al. |
| 2020/0394104 A1 | 12/2020 | Brooks |
| 2021/0034261 A1 | 2/2021 | Danilov et al. |
| 2021/0049062 A1 | 2/2021 | Balakrishnan et al. |
| 2021/0224157 A1 | 7/2021 | Parry et al. |
| 2022/0050757 A1 | 2/2022 | Tajima et al. |

OTHER PUBLICATIONS

Ganesh: "How is NAND Flash memory array organized?Tech mastery", Mar. 19, 2019, pp. 1-3, Retrieved from the Internet: URL:https://technicalmasterblog.wordpresscom/2019/03/19/how-is-nand-flash-memory-array-organized/.

Chinese patent office, "China Office Action," issued in connection with China Patent Application No. 202210267561.2 dated Jul. 16, 2025 (35 pages) (15 pages of English Translation and 20 pages of Original Document).

Chinese patent office, "China Office Action," issued in connection with China Patent Application No. 202210267561.2 dated Jan. 20, 2026 (9 pages) (3 pages of English Translation and 6 pages of Original Document).

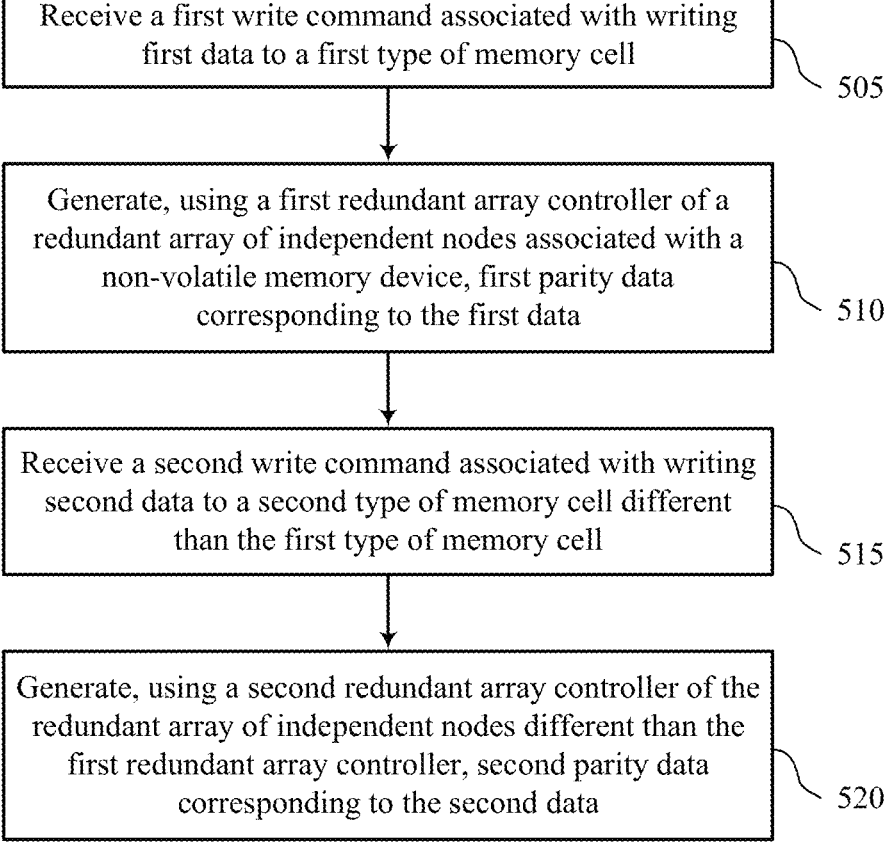

Receive a first write command associated with writing first data to a first type of memory cell

↘ 505

Generate, using a first redundant array controller of a redundant array of independent nodes associated with a non-volatile memory device, first parity data corresponding to the first data

↘ 510

Receive a second write command associated with writing second data to a second type of memory cell different than the first type of memory cell

↘ 515

Generate, using a second redundant array controller of the redundant array of independent nodes different than the first redundant array controller, second parity data corresponding to the second data

REDUNDANT ARRAY MANAGEMENT TECHNIQUES

CROSS REFERENCE

The present Application for Patent is a continuation of U.S. patent application Ser. No. 17/648,395 by YEUNG et al., entitled "REDUNDANT ARRAY MANAGEMENT TECHNIQUES," filed Jan. 19, 2022, which claims the benefit of U.S. Provisional Patent Application No. 63/162,141 by YEUNG et al., entitled "REDUNDANT ARRAY MANAGEMENT TECHNIQUES," filed Mar. 17, 2021, each of which is assigned to the assignee hereof, and each of which is expressly incorporated by reference herein.

FIELD OF TECHNOLOGY

The following relates generally to one or more systems for memory and more specifically to redundant array management techniques.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

BRIEF DESCRIPTION OF THE DRAWINGS

FIG. 5 shows a flowchart illustrating a method or methods that support redundant array management techniques in accordance with examples as disclosed herein.

DETAILED DESCRIPTION

Figure 1:
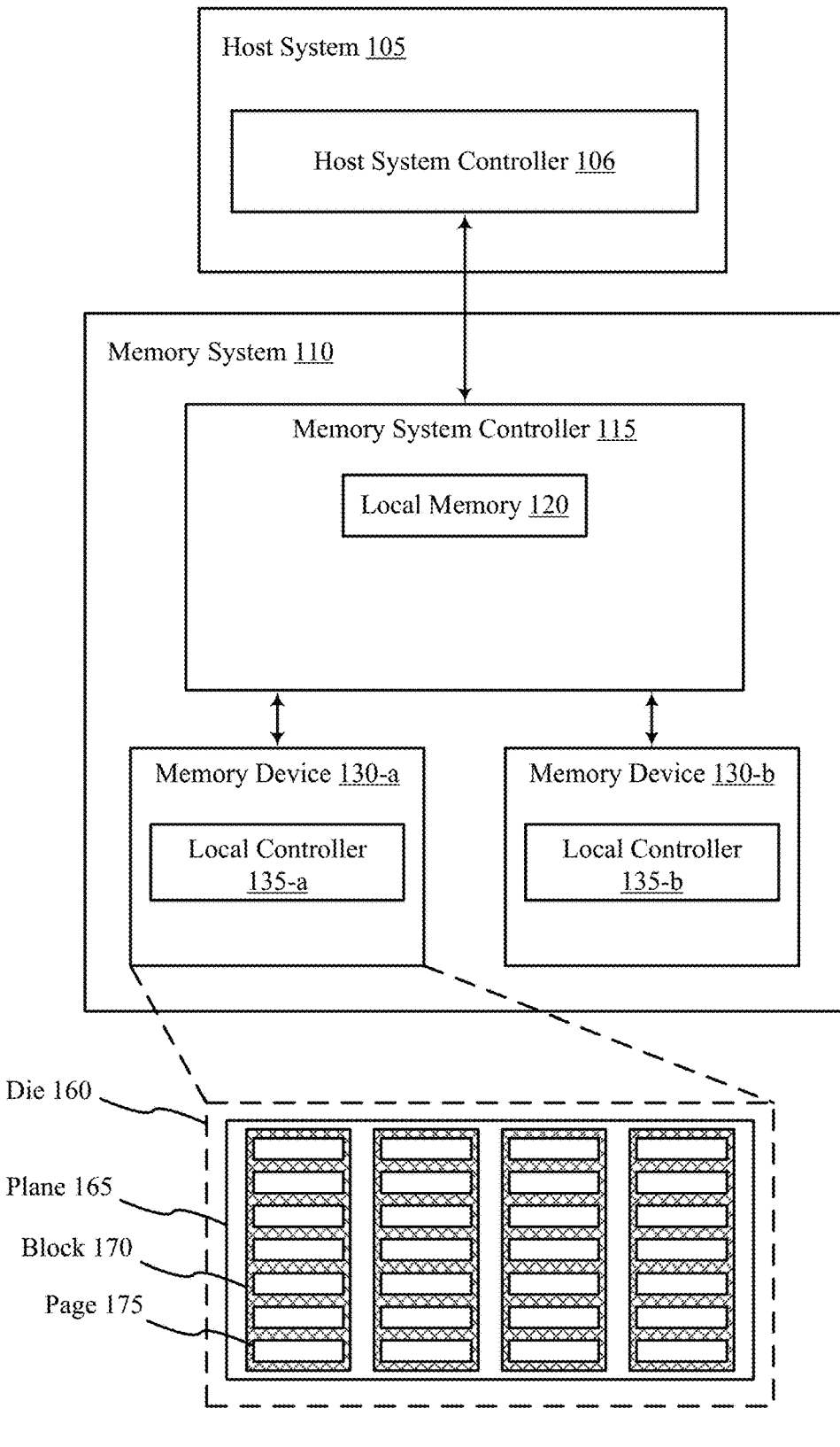
FIGS. 1 and 2 illustrate examples of systems that support redundant array management techniques in accordance with examples as disclosed herein.

A memory system may implement various redundancy techniques to protect against various failures of the memory system. For example, the memory system may implement a redundant array of independent nodes (RAIN) scheme (e.g., a redundant array of independent devices (RAID) scheme) in which data is divided and/or replicated across multiple memory devices of the memory system. The RAIN scheme may include striping and/or mirroring of the data across two or more memory devices. For example, striping may include splitting the data so that different portions of the data are stored on different memory devices, where the different portions that store the split data are collectively referred to as a stripe. Mirroring may include redundantly storing duplicate copies of the data in at least two memory devices. Additionally, the memory system may generate and store error information such as parity data in same and/or different memory devices that store the data. Accordingly, if any of the memory devices fail, or if at least a portion of the data is lost (e.g., due to some failure of the memory system), the memory system may use the parity data and the striped and/or mirrored data to recover the lost data (e.g., using exclusive or (XOR) circuitry).

The memory system may include a redundant array controller (e.g., a RAIN engine) to implement the RAIN scheme. Among other operations, the redundant array controller may generate the parity data corresponding to the data stored across two or more non-volatile memory devices of the memory system. Generating and storing the parity data, however, may increase latency associated with writing the data to the non-volatile memory devices. For example, the parity data may be written to the non-volatile memory devices as it is generated (e.g., concurrently with writing the data to the non-volatile memory devices) due to storage capacity restrictions of a volatile memory device of the memory system. Because the volatile memory device may be associated with faster access operations relative to the non-volatile memory devices, writing the parity data to the non-volatile memory devices may increase the latency of writing the data. Additionally, in some cases, multiple types of parity data may be generated based on a type of memory cell to which the data is written. Accordingly, in some cases, the redundant array controller may generate a first type of parity data followed by generating a second type of parity data, thereby increasing a latency of generating parity data.

Techniques, systems, and devices are described herein for increasing system performance, improving memory utilization, and reducing latency associated with implementing a RAIN scheme by including multiple redundant array controllers in a memory system that are each dedicated to generating a particular type of parity data. For example, the memory system may include a first redundant array controller configured to generate first parity data that may be used to correct errors associated with a first type of failure of the memory system. Additionally or alternatively, the memory system may include a second redundant array controller configured to independently generate second parity data that may be used to correct errors associated with a second type of failure of the memory system. The memory system may be configured to generate the first parity data, or the second parity data, or both based on the operation being performed, the type of data of being accessed, or the types of memory cells being accessed. The first parity data, or the second parity data, or both, may be generated using the respective redundant array controllers in response to receiving a write command. By using different controllers, some parity information determinations may be parallelized or some parity information may not be generated in some circumstances. For example, the memory system may receive a write command to write data to a particular type of memory cell. Based on the type of memory cell, the memory system may select to and then generate the first parity data, or the second parity data, or both. In some examples, the first redundant array controller and the second redundant array controller may generate the first parity data and the second parity data in parallel, thereby reducing latency associated with generating parity data corresponding to the data. Additionally, the memory system may dynamically allocate portions of a volatile memory device to store information associated with the first parity data, or the second parity data, or both. Accordingly, the memory system may store the first parity data, or the second parity data, or both, in the volatile memory device while writing the data to one or more non-volatile memory devices (e.g., and until a time after writing the data), thereby reducing latency associated with writing the data and improving the memory utilization of the volatile memory device. Additionally, by dynamically allocating (or de-allocating) portions of the volatile memory device to RAIN operations, the memory system may scope the space in the volatile memory device to perform the specific operations and increase the amount of space used in the volatile memory device.

Figure 2:
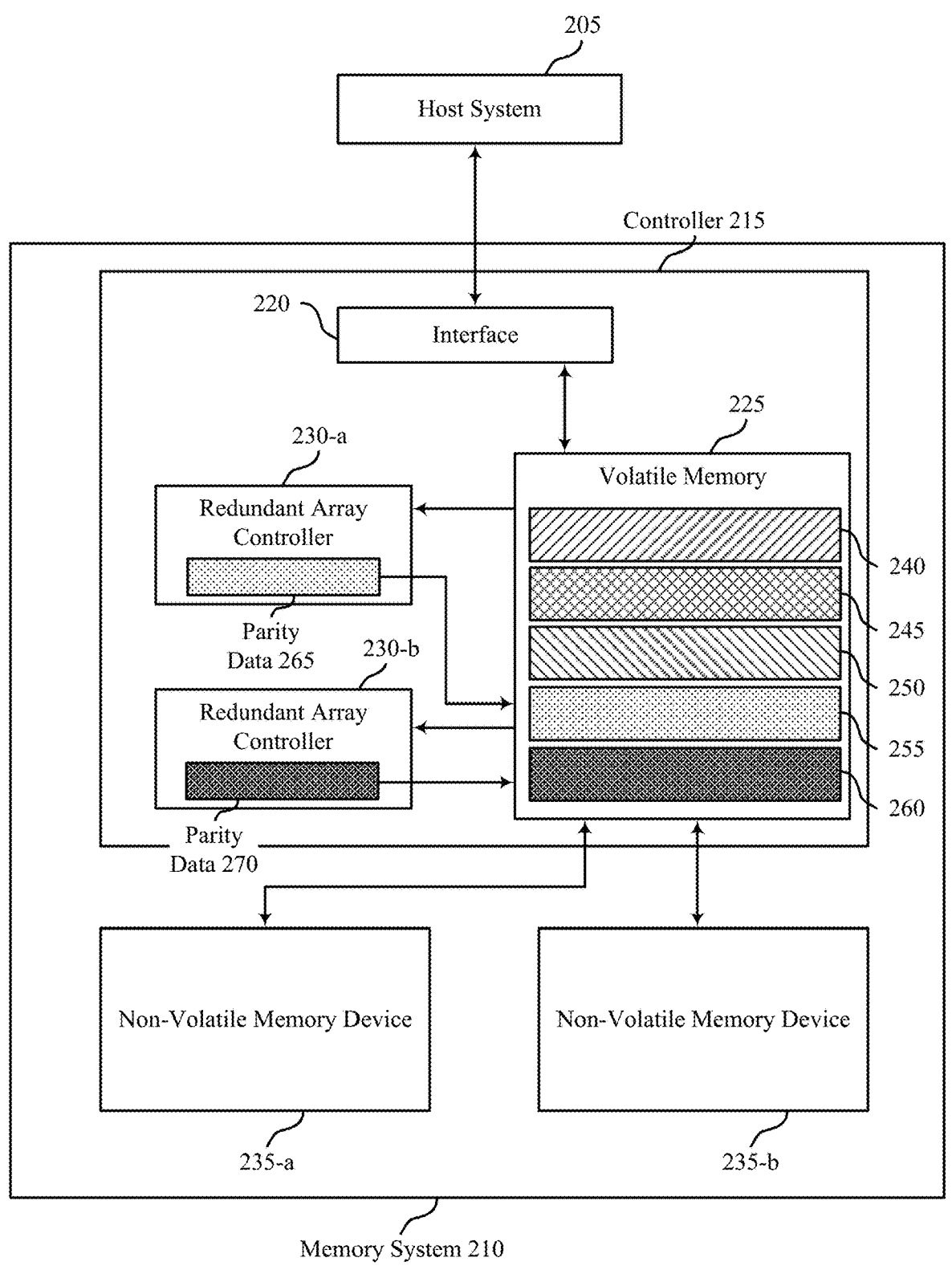

Features of the disclosure are initially described in the context of systems with reference to FIGS. 1 through 2. Features of the disclosure are described in the context of a process flow with reference to FIG. 3. These and other features of the disclosure are further illustrated by and described in the context of an apparatus diagram and a flowchart that relate to redundant array management techniques with reference to FIGS. 4 through 5.

FIG. 1 illustrates an example of a system 100 that supports redundant array management techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some examples, the memory system 110 may implement a RAIN scheme in which data is striped and/or mirrored across two or more memory devices 130. For example, in response to receiving a write command to write data, the memory system controller 115 (e.g., or a local controller 135) may split the data into multiple portions and may store different portions of the data on different memory devices 130. Additionally, or alternatively, the memory system controller 115 may store duplicate copies of the data on different memory devices 130. The memory system 110 may include one or more redundant array controllers (e.g., included in or coupled with the memory system controller 115) configured to generate parity data corresponding to the data that may be used (e.g., using XOR circuitry) to recover the data if any portion of the data is lost due to a failure of a component of the memory system 110. Some examples of failures may include multi-plane failures and word line failures, among other failures. Multi-plane failures may correspond to an error of a word line in two or more planes 165 in a memory die 160 of a memory device 130. In some examples, multi-plane failures may be caused by a failure of a charge pump associated with the word line or an increased latency in one of the two or more planes 165, among other causes. Word line failures may correspond to an error of one or more word lines of a plane 165 in a memory die 160 of a memory device 130.

To improve performance associated with implementing the RAIN scheme, the memory system 110 may include two redundant array controllers that each are configured to generate a particular type of parity data. For example, the memory system 110 may include a first redundant array controller configured to generate first parity data that may be used to correct errors associated with multi-plane failures (e.g., a type of failure). Additionally, the memory system 110 may include a second redundant array controller configured to independently generate second parity data that may be used to correct errors associated with word line failures (e.g., a type of failure). In response to receiving a write command, one or both of the first redundant array controller and the second redundant array controller may generate respective parity data. For example, the memory system 110 may receive a write command to write data to a particular type of memory cell. If writing data to memory cells configured to store two or more bits of data (e.g., MLCs, TLCs, QLCs), the first redundant array controller may generate the first parity data and the second redundant array controller may generate the second parity data (e.g., in parallel with the first redundant array controller). Alternatively, if writing data to memory cells configured to store one bit of data (e.g., SLCs), the second redundant array controller may generate the second parity data. Additionally, the memory system 110 may dynamically allocate portions of the local memory 120 to store the first parity data, or the second parity data, or both. Accordingly, the memory system 110 may store the first parity data, or the second parity data, or both, in the local memory 120 while writing the data to one or more memory devices 130 (e.g., and until a time after writing the data), thereby reducing latency associated with writing the data and improving the memory utilization of the memory system 110.

The system 100 may include any quantity of non-transitory computer readable media that support redundant array management techniques. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is an MNAND system.

FIG. 2 illustrates an example of a system 200 that supports redundant array management techniques in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include non-volatile memory devices 235 (e.g., a non-volatile memory device 235-a and a non-volatile memory device 235-b) to store data transferred between the memory system 210 and the host system 205, e.g., in response to receiving access commands from the host system 205, as described herein. The non-volatile memory devices 235 may be an example of a memory device 130 including non-volatile memory cells, a NAND device, or some other non-volatile memory device. Additionally, the non-volatile memory devices 235 may include different types of memory cells. For example, the non-volatile memory device 235-a may include a first type of memory cell configured to store two or more bits of data (e.g., TLCs, MLCs, QLCs) and the non-volatile memory device 235-b may include a second type of memory cell configured to store one bit of data (e.g., SLCs).

The memory system 210 may additionally include an interface 220 for communication with the host system 205. The interface 220 may be an example of a physical host interface used to transfer data between the host system 205 and the memory system 210. If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210.

The memory system 210 may additionally include a controller 215 for executing the commands received from the host system 205 and controlling the movement of data throughout the memory system 210. The controller 215 may be an example of the memory system controller 115 or a local controller 135 as described with reference to FIG. 1. Upon receipt of each access command, the interface 220 may communicate the command to a controller 215 included in the memory system 210, for example, via a bus.

The controller 215 may include a volatile memory device 225 used in executing the commands received from the host system 205. The volatile memory device 225 may be an example of a local memory 120, a memory device 130 that includes volatile memory cells, an SRAM device, or any other volatile memory device. In some examples, the volatile memory device 225 may be associated with faster access and operational speeds relative to a non-volatile memory device 235, and the non-volatile memory device 235 may be associated with larger storage capacity relative to the volatile memory device 225. Accordingly, if performing operations on data, the controller 215 may transfer the data to the volatile memory device 225 (e.g., from a non-volatile memory device 235) and then perform an operation on the data. For example, to update an L2P mapping table, the controller 215 may transfer a portion of the L2P mapping table to be updated from a non-volatile memory device 235 to the volatile memory device 225, update the portion of the L2P mapping table, and transfer the portion of the L2P mapping table back to the non-volatile memory device 235. Additionally, in some examples, the volatile memory device 225 may serve as a buffer for temporary storage of data transferred throughout the memory system 210. For example, the volatile memory device 225 may be partitioned into multiple portions that are each associated with storing a different type of data. For example, the volatile memory device 225 may include at least a write data portion 240 associated with storing write data received from the host system 205, a read data portion 245 associated with storing data read from non-volatile memory devices 235, and an L2P portion 250 associated with storing portions of an L2P mapping table. Accordingly, the volatile memory device 225 may store write data received from the host system 205 in the write data portion 240 before writing the data in one or more corresponding non-volatile memory devices 235, store read data in the read data portion 245 before transferring the data to the host system 205, and store portions of L2P mapping tables in the L2P portion 250 if updating the L2P mapping table.

The memory system 210 may implement a RAIN scheme using one or more redundant array controllers 230. The memory system 210 may implement the RAIN scheme to protect against failures of one or more components of the memory system 210 (e.g., multi-plane failures, word line failures, or other failures of the memory system 210). For example, in response to receiving a write command to write data to one or more of the non-volatile memory devices 235, the controller 215 may stripe and/or mirror the data across multiple non-volatile memory devices 235. Here, portions of the non-volatile memory devices 235 may be configured to store redundant data and may be referred to as redundant nodes, redundant devices, or redundant NAND. Additionally, in some cases, a redundant array controller 230 may generate parity data corresponding to the data which the controller 215 may use to recover the data if at least a portion of the data is lost or corrupted due to a failure in the memory system 210.

In some cases, the memory system 210 may implement the RAIN schemes using a single redundant array controller 230. However, using a single redundant array controller 230 may reduce system performance and increase latency. For example, if writing data to the second type of memory cell (e.g., TLCs, MLCs, QLCs), the redundant array controller 230 may generate first parity data to correct errors associated with multi-plane failures followed by second parity data to correct errors associated with word line failures (e.g., or vice versa), thereby increasing latency associated with generating the first parity data or the second parity data. Additionally, in some cases, the volatile memory device 225 may include a first parity portion 255 for storing the first parity data and a second parity portion 260 for storing the second parity data in addition to the write data portion 240, the read data portion 245, and the L2P portion 250. However, in some cases, a size of each portion of the volatile memory device 225 may be static or fixed. As a result, in some examples, the first parity portion 255 and the second parity portion 260 may have a limited storage capacity that is insufficient for storing the first parity data and the second parity data. Accordingly, the controller 215 may write the first parity data and the second parity data to corresponding non-volatile memory devices 235 as it is generated (e.g., concurrently with writing the data) which may increase a latency associated with writing the data.

To improve performance associated with implementing the RAIN scheme, the memory system 210 may include two redundant array controllers 230 that are each configured to generate a particular type of parity data. For example, the controller 215 may include or be coupled with a redundant array controller 230-*a* that is configured to generate parity data 265 and a redundant array controller 230-*b* that is configured to generate parity data 270. In some examples, the parity data 265 may be used to correct multi-plane errors and the parity data 270 may be used to correct word line errors.

The redundant array controller 230-*a* and the redundant array controller 230-*b* may generate respective parity data based on a type of memory cell to which data is to be written and may manage other aspects related to generating the respective parity data. The redundant array controller 230-*a* and the redundant array controller 230-*b* may be examples of a RAIN engine. In some cases, the redundant array controller 230-*a* and the redundant array controller 230-*b* may be implemented using hardware, firmware, software, or any combination thereof. In some examples, the controller 215 may receive a write command from the host system 205 that is associated with writing data to the first type of memory cell (e.g., to TLCs, MLCs, or QLCs, included in the non-volatile memory device 235-*a*) or to the second type of memory cell (e.g., to SLCs included in the non-volatile memory device 235-*b*) and may temporarily store the data in the write data portion 240. In some examples, data that is written to the first type of memory cell may be susceptible to both multi-plane errors and word line errors. Accordingly, if the write command includes writing the data to the first type of memory cell, the redundant array controller 230-*a* may generate the parity data 265 and the redundant array controller 230-*b* may generate the parity data 270. In some examples, the redundant array controller 230-*a* and the redundant array controller 230-*b* may respectively generate the parity data 265 and the parity data 270 in parallel, thereby reducing latency associated with generating parity data corresponding to the data. Alternatively, in some examples, data that is written to the second type of memory cell may be susceptible to word line errors but may not be susceptible to multi-plane errors. Accordingly, if the write command includes writing the data to the second type of memory cell, the redundant array controller 230-*b* may generate the parity data 270 and the redundant array controller 230-*a* may refrain from generating the parity data 265.

The redundant array controller 230-*a* may store the parity data 265 in the volatile memory device 225 and the redundant array controller 230-*b* may store the parity data 270 in the volatile memory device 225. For example, the redundant array controller 230-*a* may send the parity data 265 to the volatile memory device 225, and the volatile memory device 225 may store the parity data 265 in the first parity portion 255. Additionally, the redundant array controller 230-*b* may send the parity data 270 to the volatile memory device 225, and the volatile memory device 225 may store the parity data 270 in the second parity portion 260.

To increase a quantity of parity data 265 or parity data 270 (or both) that may be stored in the volatile memory device 225 (e.g., to enable storage of the parity data 265, the parity data 270, or a combination thereof, in the volatile memory device 225), the controller 215 may dynamically allocate the portions (e.g., the write data portion 240, the read data portion 245, the L2P portion 250, the first parity portion 255, the second parity portion 260) of the volatile memory device 225. For example, in response to receiving a write command, the controller 215 may allocate at least a part of the read data portion 245, or the L2P portion 250, or both, to the write data portion 240, the first parity portion 255, the second parity portion 260, or a combination thereof. Accordingly, the controller 215 may accommodate the storage of additional write data, parity data 265, parity data 270, or a combination thereof, in the volatile memory device 225. In some examples, the controller 215 may allocate the portions of the volatile memory device 225 based on what parity data will be generated. For example, if the redundant array controller 230-*a* does not generate the parity data 265 (e.g., in response to writing data to the second type of memory cell), the controller 215 may allocate at least a part of the first parity portion 255 to one or more other portions of the volatile memory device 225 (e.g., to the write data portion 240, to the second parity portion 260). For example, the controller 215 may allocate at least the part of first parity portion 255 to cache the data to be written to the second type of memory cell, thereby increasing a quantity of data that may be written to corresponding non-volatile memory devices 235 and reducing latency associated with write operations. Because space in the volatile memory device 225 (e.g., SRAM) of a memory system 210 may be limited, the memory system 210 may be configured to dynamically allocate the space of the volatile memory device 225 based on the current list of operations being performed, including dynamically allocating space for the RAIN operations.

Additionally, the controller 215 may allocate the portions of the volatile memory device 225 based on various parameters. For example, the controller 215 may receive a read command from the host system 205. In response to receiving the read command, the controller 215 may allocate one or more portions of the volatile memory device 225 (e.g., the write data portion 240, the L2P portion 250, the first parity portion 255, the second parity portion 260, or a combination thereof) to the read data portion 245. In this way, the controller 215 may increase a quantity of read data that may be stored in the volatile memory device 225, thereby reducing latency associated with read operations.

Additionally, or alternatively, the controller 215 may allocate the portions of the volatile memory device 225 based on a power state of the volatile memory device 225, a quantity of received write commands, a quantity of received read commands, a quantity of parity data 265 stored or to be stored in the volatile memory device 225, a quantity of parity data 270 stored or to be stored in the volatile memory device 225, or a combination thereof. For example, based on the quantity of received read commands or write commands, the controller 215 may allocate the portions of the volatile memory device 225 to accommodate the storage of the read data, write data, L2P table mapping portions, parity data 265, parity data 270, or a combination thereof, that is associated with the read commands, the write commands, or a combination thereof.

Based on allocating the portions of the volatile memory device 225, the controller 215 may refrain from writing the parity data 265 and the parity data 270 to corresponding non-volatile memory devices 235 while writing data to corresponding non-volatile memory devices 235. For example, the controller 215 may store the parity data 265 in the volatile memory device 225 until the data corresponding to the parity data 265 is written to a page of the non-volatile memory device 235-a (e.g., to a page of first type memory cells). After writing the data to the page, the controller 215 may store the parity data 265 in one or more non-volatile memory devices 235 that may or may not include the non-volatile memory device 235-a. Additionally, or alternatively, the controller 215 may store the parity data 270 in the volatile memory device 225 until a threshold quantity of pages of a block that stores the data corresponding to the parity data 270 store valid data. After the threshold quantity of pages of the block store valid data, the controller 215 may store the parity data 270 in one or more non-volatile memory devices 235.

In some examples, the redundant array controller 230-a and the redundant array controller 230-a may be coupled with one or more non-volatile memory devices 235 and may send respective parity data to the one or more non-volatile memory devices 235.

Figure 3:
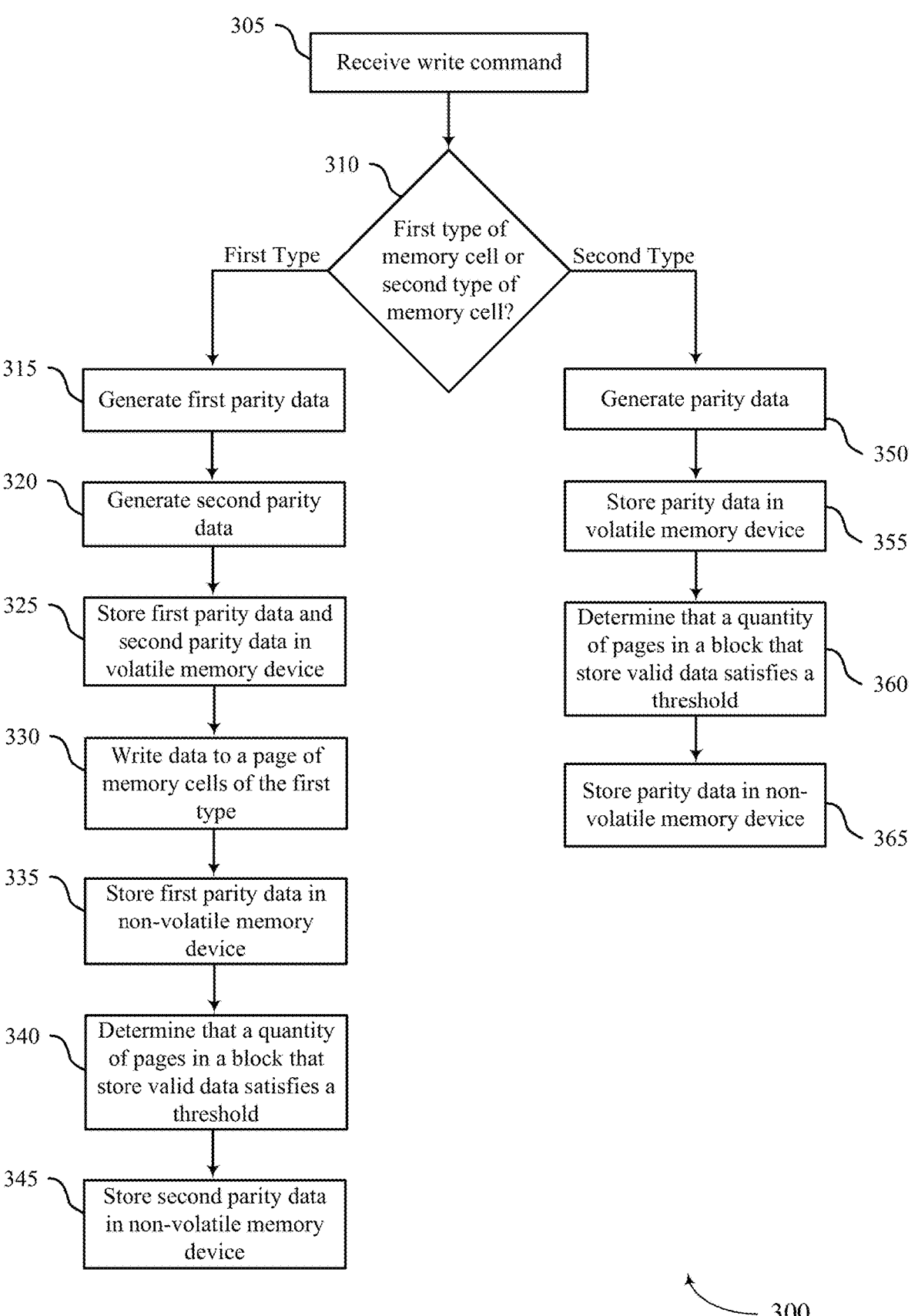
FIG. 3 illustrates an example of a process flow that supports redundant array management techniques in accordance with examples as disclosed herein.

FIG. 3 illustrates an example of a process flow 300 that supports redundant array management techniques in accordance with examples as disclosed herein. Process flow 300 may be performed by components of a memory system, such as a memory system 110 or a memory system 210 described with reference to FIGS. 1 and 2. For example, process flow 300 may be performed by a controller of a memory system or a memory device (or both) and one or more redundant array controllers. The controller may be an example of a memory system controller 115, a local controller 135, or a controller 215 as described with reference to FIGS. 1 and 2. The one or more redundant array controllers may be examples of a redundant array controller 230 as described with reference to FIG. 2. Process flow 300 may depict a process for generating parity data using the one or more redundant array controllers in response to receiving a write command at the controller, and the process may be implemented to improve memory utilization, reduce latency, and increase redundancy operation performance, among other benefits.

Aspects of the process flow 300 may be implemented by a controller, among other components. Additionally or alternatively, aspects of the process flow 300 may be implemented as instructions stored in memory (e.g., firmware stored in a memory coupled with the memory system controller 115, the local controller 135, and/or the redundant array controller 230). For example, the instructions, if executed by a controller (e.g., a memory system controller 115, a local controller 135, a redundant array controller 230), may cause the controller to perform the operations of the process flow 300.

In the following description of the process flow 300, the operations may be performed in different orders or at different times. Some operations may also be omitted from the process flow 300, and other operations may be added to the process flow 300. Additionally, the controller may receive multiple write commands and different operations of the process flow 300 may be performed based on the write command as described below.

At 305, a write command may be received. For example, the controller may receive the write command from a host system coupled with the controller that is associated with writing data to a type of memory cell (e.g., includes data to be written to one or more memory cells of a particular type). For example, the memory system may include one or non-volatile memory devices having a first type of memory cell configured to store two or more bits of data. Additionally, or alternatively, the memory system may include one or more other non-volatile memory devices having a second type of memory cell configured to store one bit of data.

At 310, the type of memory cell to which the data is to be written may be evaluated. For example, the controller may determine whether the write command is associated with writing the data to the first type of memory cell or to the second type of memory cell.

If, at 310, the controller determines that the write command is associated with writing the data to the first type of memory cell, the controller, a first redundant array controller, and a second redundant array controller may perform 315 through 345 as follows.

At 315, first parity data may be generated in response to receiving the write command. For example, data written to the first type of memory cell may be susceptible to a first type of failure that is associated with accessing data in the non-volatile memory device (e.g., a multi-plane error). The first redundant array controller may generate the first parity data to correct errors associated with the first type of failure.

At 320, second parity data may be generated in response to receiving the write command. For example, the data written to the first type of memory cell may additionally be susceptible to a second type of failure that is associated with accessing data in the non-volatile memory device (e.g., a word line error). The second redundant array controller may generate the second parity data to correct errors associated with the second type of failure.

At 325, the first parity data and the second parity data may be stored in a volatile memory device of the memory system. For example, the first redundant array controller may send the first parity data to the volatile memory device and the second redundant array controller may second the second parity data to the volatile memory device. In some examples, to enable the storage of the first parity data and the second parity data, the volatile memory device may allocate one or more portions of the volatile memory device for storing write data, read data, or portions of an L2P mapping table to store the first parity data, the second parity data, or a combination thereof.

At 330, the data may be written to a page of memory cells of the first type of memory cell. For example, the controller may write the data to a page of a first non-volatile memory device having the first type of memory cell.

At 335, the first parity data may be stored in a second non-volatile memory device. For example, the controller may write the first parity data to the second non-volatile memory device after the controller writes the first parity data to the page. That is, the controller may store the first parity data in the volatile memory device until the controller writes the data to the page. In some examples, the second non-volatile memory device may be the first non-volatile memory device. In some other examples, the second non-volatile memory device be different from the first non-volatile memory device.

At 340, a threshold quantity of pages in a block storing the data may be determined to store valid data. For example, the controller may determine a quantity of pages in the block that store valid data and may determine whether the quantity of pages satisfies (e.g., is greater than, is greater than or equal to) the threshold quantity of pages. In some examples, the threshold quantity of pages may be a quantity of pages included in the block.

At 345, the second parity data may be stored in a third non-volatile memory device. For example, if the controller determines that the quantity of pages in the block storing valid data satisfies the threshold quantity of pages, the controller may store the second parity data in the third non-volatile memory device. That is, in some examples, the controller may store the second parity data in the volatile memory device until the quantity of pages in the block storing valid data satisfies the threshold quantity of pages. In some examples, the third non-volatile memory device may include the block. In some other examples, the third non-volatile memory device may not include the block.

If, at 310, the controller determines that the write command is associated with writing data to the second type of memory cell, the controller and the first redundant array controller may perform 350 through 365 as follows.

At 350, parity data may be generated in response to receiving the write command. For example, the data written to the second type of memory cell may be susceptible to the second type of failure (e.g., the word line error), but may not be susceptible to the first type of failure. Accordingly, the second redundant array controller may generate the parity data to correct errors associated with the second type of failure. The first redundant array controller may refrain from generating parity data.

At 355, the parity data may be stored in the volatile memory device. For example, the second redundant array controller may second the second parity data to the volatile memory device. In some examples, to enable the storage of the second parity data, the volatile memory device may allocate one or more portions of the volatile memory device for storing write data, read data, or portions of an L2P mapping table to store the second parity data.

At 360, a threshold quantity of pages in a block storing the data may be determined to store valid data. For example, the controller may write the data to a page in the block, the block included in a first non-volatile memory device. The controller may determine a quantity of pages in the block that store valid data and may determine whether the quantity of pages satisfies (e.g., is greater than, is greater than or equal to) the threshold quantity of pages.

At 365, the parity data may be stored in a second non-volatile memory device. For example, if the controller determines that the quantity of pages in the block storing valid data satisfies the threshold quantity of pages, the controller may store the parity data in the second non-volatile memory device. That is, in some examples, the controller may store the parity data in the volatile memory device until the quantity of pages in the block storing valid data satisfies the threshold quantity of pages. In some examples, the second non-volatile memory device may be the first non-volatile memory device. In some other examples, the second non-volatile memory device be different from the first non-volatile memory device.

Figure 4:
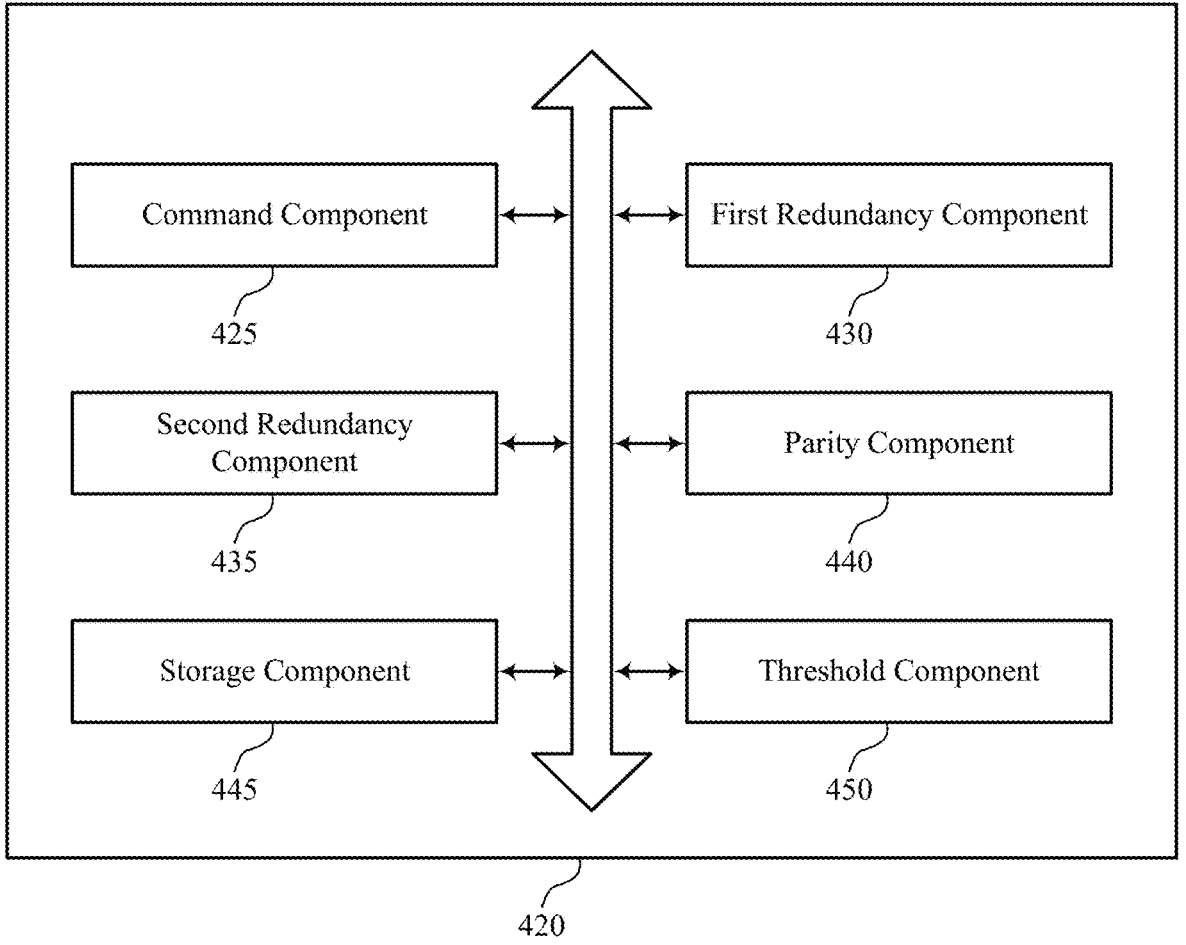
FIG. 4 shows a block diagram of a memory system that supports redundant array management techniques in accordance with examples as disclosed herein.

FIG. 4 shows a block diagram 400 of a memory system 420 that supports redundant array management techniques in accordance with examples as disclosed herein. The memory system 420 may be an example of aspects of a memory system as described with reference to FIGS. 1 through 3. The memory system 420, or various components thereof, may be an example of means for performing various aspects of redundant array management techniques as described herein. For example, the memory system 420 may include a command component 425, a first redundancy component 430, a second redundancy component 435, a parity component 440, a storage component 445, a threshold component 450, or any combination thereof. Each of these components may communicate, directly or indirectly, with one another (e.g., via one or more buses).

The command component 425 may be configured as or otherwise support a means for receiving a first write command associated with writing first data to a first type of memory cell. The first redundancy component 430 may be configured as or otherwise support a means for generating, using a first redundant array controller of a redundant array of independent nodes associated with a non-volatile memory device, first parity data corresponding to the first data. In some examples, the command component 425 may be configured as or otherwise support a means for receiving a second write command associated with writing second data to a second type of memory cell different than the first type of memory cell. The second redundancy component 435 may be configured as or otherwise support a means for generating, using a second redundant array controller of the redundant array of independent nodes different than the first redundant array controller, second parity data corresponding to the second data.

In some examples, the first redundant array controller is configured to generate the first parity data to correct errors associated with a first type of failure that is associated with accessing data in the non-volatile memory device. In some examples, the second redundant array controller is configured to generate the second parity data to correct errors associated with a second type of failure that is associated with accessing data in the non-volatile memory device.

In some examples, the second redundancy component 435 may be configured as or otherwise support a means for generating, using the second redundant array controller, third parity data corresponding to the first data, the third parity data used to correct errors associated with the second type of failure.

In some examples, the first type of failure corresponds to a first error of a word line in two or more planes in a memory die of the non-volatile memory device. In some examples, the second type of failure corresponds to a second error of one or more word lines of a plane in the memory die.

In some examples, the parity component 440 may be configured as or otherwise support a means for storing the first parity data in the volatile memory device coupled with the first redundant array controller and the second redundant array controller until the first data is written to a page including memory cells of the first type of memory cell.

In some examples, the parity component 440 may be configured as or otherwise support a means for storing the first parity data in the non-volatile memory device after writing the first data to the page.

In some examples, the parity component 440 may be configured as or otherwise support a means for storing the second parity data in the volatile memory device coupled with the first redundant array controller and the second redundant array controller.

In some examples, the threshold component 450 may be configured as or otherwise support a means for determining that a quantity of pages in a block that store valid data satisfies a threshold, at least a portion of the block storing the second data. In some examples, the parity component 440 may be configured as or otherwise support a means for storing the second parity data in the non-volatile memory device based at least in part on the determination.

In some examples, the storage component 445 may be configured as or otherwise support a means for allocating, in response to receiving a read command, a portion of the volatile memory device associated with storing the first parity data to store read data or to store data associated with mapping logical addresses to physical addresses.

In some examples, the storage component 445 may be configured as or otherwise support a means for allocating, in response to receiving the second write command to write the second data to the second type of memory cell, a portion of the volatile memory device to cache the second data, the portion of the volatile memory device associated with storing parity data that corresponds to writing data to the first type of memory cell.

In some examples, the storage component 445 may be configured as or otherwise support a means for allocating a first portion of the volatile memory device to store the first parity data, a second portion of the volatile memory device to store the second parity data, or both, based at least in part on a power state of the volatile memory device, a quantity of received write commands, a quantity of received read commands, a quantity of the first parity data stored in the volatile memory device, a quantity of the second parity data stored in the volatile memory device, or a combination thereof.

In some examples, the first type of memory cell is configured to store two or more bits of data. In some examples, the second type of memory cell is configured to store one bit of data.

In some examples, the first parity data is associated with multi-plane errors and the second parity data is associated with word line errors.

FIG. 5 shows a flowchart illustrating a method 500 that supports redundant array management techniques in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include receiving a first write command associated with writing first data to a first type of memory cell. The operations of 505 may be performed in accordance with examples as disclosed herein. In some examples, aspects of the operations of 505 may be performed by a command component 425 as described with reference to FIG. 4.

At 510, the method may include generating, using a first redundant array controller of a redundant array of independent nodes associated with a non-volatile memory device, first parity data corresponding to the first data. The operations of 510 may be performed in accordance with examples as disclosed herein. In some examples, aspects of the operations of 510 may be performed by a first redundancy component 430 as described with reference to FIG. 4.

At 515, the method may include receiving a second write command associated with writing second data to a second type of memory cell different than the first type of memory cell. The operations of 515 may be performed in accordance with examples as disclosed herein. In some examples, aspects of the operations of 515 may be performed by a command component 425 as described with reference to FIG. 4.

At 520, the method may include generating, using a second redundant array controller of the redundant array of independent nodes different than the first redundant array controller, second parity data corresponding to the second data. The operations of 520 may be performed in accordance with examples as disclosed herein. In some examples, aspects of the operations of 520 may be performed by a second redundancy component 435 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving a first write command associated with writing first data to a first type of memory cell, generating, using a first redundant array controller of a redundant array of independent nodes associated with a non-volatile memory device, first parity data corresponding to the first data, receiving a second write command associated with writing second data to a second type of memory cell different than the first type of memory cell, and generating, using a second redundant array controller of the redundant array of independent nodes different than the first redundant array controller, second parity data corresponding to the second data.

In some examples of the method 500 and the apparatus described herein, the first redundant array controller may be configured to generate the first parity data to correct errors associated with a first type of failure that may be associated with accessing data in the non-volatile memory device and the second redundant array controller may be configured to generate the second parity data to correct errors associated with a second type of failure that may be associated with accessing data in the non-volatile memory device.

Some examples of the method 500 and the apparatus described herein may further include operations, features, circuitry, logic, means, or instructions for generating, using the second redundant array controller, third parity data corresponding to the first data, the third parity data used to correct errors associated with the second type of failure.

In some examples of the method 500 and the apparatus described herein, the first type of failure corresponds to a first error of a word line in two or more planes in a memory die of the non-volatile memory device and the second type of failure corresponds to a second error of one or more word lines of a plane in the memory die.

Some examples of the method 500 and the apparatus described herein may further include operations, features, circuitry, logic, means, or instructions for storing the first parity data in the volatile memory device coupled with the first redundant array controller and the second redundant array controller until the first data is written to a page including memory cells of the first type of memory cell.

Some examples of the method 500 and the apparatus described herein may further include operations, features, circuitry, logic, means, or instructions for storing the first parity data in the non-volatile memory device after writing the first data to the page.

Some examples of the method 500 and the apparatus described herein may further include operations, features, circuitry, logic, means, or instructions for storing the second parity data in the volatile memory device coupled with the first redundant array controller and the second redundant array controller.

Some examples of the method 500 and the apparatus described herein may further include operations, features, circuitry, logic, means, or instructions for determining that a quantity of pages in a block that store valid data satisfies a threshold, at least a portion of the block storing the second data and storing the second parity data in the non-volatile memory device based at least in part on the determination.

Some examples of the method 500 and the apparatus described herein may further include operations, features, circuitry, logic, means, or instructions for allocating, in response to receiving a read command, a portion of the volatile memory device associated with storing the first parity data to store read data or to store data associated with mapping logical addresses to physical addresses.

Some examples of the method 500 and the apparatus described herein may further include operations, features, circuitry, logic, means, or instructions for allocating, in response to receiving the second write command to write the second data to the second type of memory cell, a portion of the volatile memory device to cache the second data, the portion of the volatile memory device associated with storing parity data that corresponds to writing data to the first type of memory cell.

Some examples of the method 500 and the apparatus described herein may further include operations, features, circuitry, logic, means, or instructions for allocating a first portion of the volatile memory device to store the first parity data, a second portion of the volatile memory device to store the second parity data, or both, based at least in part on a power state of the volatile memory device, a quantity of received write commands, a quantity of received read commands, a quantity of the first parity data stored in the volatile memory device, a quantity of the second parity data stored in the volatile memory device, or a combination thereof.

In some examples of the method 500 and the apparatus described herein, the first type of memory cell may be configured to store two or more bits of data and the second type of memory cell may be configured to store one bit of data.

In some examples of the method 500 and the apparatus described herein, the first parity data may be associated with multi-plane errors and the second parity data may be associated with word line errors.

It should be noted that the methods described above describe possible implementations, and that the operations and the steps may be rearranged or otherwise modified and that other implementations are possible. Further, portions from two or more of the methods may be combined.

An apparatus is described. The apparatus may include a volatile memory device, a non-volatile memory device, a first redundant array controller of a redundant array of independent nodes associated with the non-volatile memory device, a second redundant array controller of the redundant array of independent nodes, and a controller coupled with the volatile memory device, the non-volatile memory device, the first redundant array controller, and the second redundant array controller, the controller configured to cause the apparatus to receive a first write command associated with writing first data to a first type of memory cell, generate, using the first redundant array controller, first parity data corresponding to the first data, receive a second write command associated with writing second data to a second type of memory cell different than the first type of memory cell, and generate, using the second redundant array controller different than the first redundant array controller, second parity data corresponding to the second data.

In some examples of the apparatus, the first redundant array controller may be configured to generate the first parity data to correct errors associated with a first type of failure that may be associated with accessing data in the non-volatile memory device, and the second redundant array controller may be configured to generate the second parity data to correct errors associated with a second type of failure that may be associated with accessing data in the non-volatile memory device.

In some examples of the apparatus, the controller may be further configured to cause the apparatus to generate, using the second redundant array controller, third parity data corresponding to the first data, the third parity data used to correct errors associated with the second type of failure.

In some examples of the apparatus, the first type of failure corresponds to a first error of a word line in two or more planes in a memory die of the non-volatile memory device and the second type of failure corresponds to a second error of one or more word lines of a plane in the memory die.

In some examples of the apparatus, the controller may be further configured to cause the apparatus to store the first parity data in the volatile memory device coupled with the first redundant array controller and the second redundant array controller until the first data may be written to a page including memory cells of the first type of memory cell.

In some examples of the apparatus, the controller may be further configured to cause the apparatus to store the first parity data in the non-volatile memory device after writing the first data to the page.

In some examples of the apparatus, the controller may be further configured to cause the apparatus to store the second parity data in the volatile memory device coupled with the first redundant array controller and the second redundant array controller.

In some examples of the apparatus, the controller may be further configured to cause the apparatus to determine that a quantity of pages in a block that store valid data satisfies a threshold, at least a portion of the block storing the second data and store the second parity data in the non-volatile memory device based at least in part on the determination.

In some examples of the apparatus, the controller may be further configured to cause the apparatus to allocate, in response to receiving a read command, a portion of the volatile memory device associated with storing the first parity data to store read data or to store data associated with mapping logical addresses to physical addresses.

In some examples of the apparatus, the controller may be further configured to cause the apparatus to allocate, in response to receiving the second write command to write the second data to the second type of memory cell, a portion of the volatile memory device to cache the second data, the portion of the volatile memory device associated with storing parity data that corresponds to writing data to the first type of memory cell.

In some examples of the apparatus, the controller may be further configured to cause the apparatus to allocate a first portion of the volatile memory device to store the first parity data, a second portion of the volatile memory device to store the second parity data, or both, based at least in part on a power state of the volatile memory device, a quantity of received write commands, a quantity of received read commands, a quantity of the first parity data stored in the volatile memory device, a quantity of the second parity data stored in the volatile memory device, or a combination thereof.

In some examples of the apparatus, the first type of memory cell may be configured to store two or more bits of data and the second type of memory cell may be configured to store one bit of data.

In some examples of the apparatus, the first parity data may be associated with multi-plane errors and the second parity data may be associated with word line errors.

Another apparatus is described. The apparatus may include a non-volatile memory device, a volatile memory device coupled with the non-volatile memory device and configured to store information associated with operating the non-volatile memory device, a first redundant array controller coupled with the volatile memory device and configured to generate first parity data to correct errors associated with a first type of failure that is associated with accessing data in the non-volatile memory device, and a second redundant array controller coupled with the volatile memory device and configured to generate second parity data to correct errors associated with a second type of failure that is associated with accessing data in the non-volatile memory device.

In some examples of the apparatus, the first redundant array controller may be further configured to generate the first parity data in response to a first write command associated with writing first data to a first type of memory cell of the non-volatile memory device, the first parity data corresponding to the first data, and the second redundant array controller may be further configured to generate the second parity data in response to a second write command associated with writing second data to the first type of memory cell and to a second type of memory cell of the non-volatile memory device different than the first type of memory cell, the second parity data corresponding to the second data.

In some examples of the apparatus, the first redundant array controller may be further configured to store the first parity data in the volatile memory device until the first data may be written to a page including memory cells of the first type of memory cell in the non-volatile memory device.

In some examples of the apparatus, the second redundant array controller may be further configured to store the second parity data in the volatile memory device until a threshold quantity of pages in a block that stores the second data store valid data.

In some examples of the apparatus, the first type of memory cell may be configured to store two or more bits of data and the second type of memory cell may be configured to store one bit of data.

In some examples of the apparatus, the volatile memory device may be configured to allocate a portion of the volatile memory device associated with storing the first parity data to store read data during a read operation or to store data associated with mapping logical addresses to physical addresses.

In some examples of the apparatus, the volatile memory device may be configured to allocate a portion of the volatile memory device to cache first data during a write operation to write the first data to a second type of memory cell, the portion of the volatile memory device associated with storing parity data that corresponds to writing second data to a first type of memory cell.

In some examples of the apparatus, the volatile memory device may be configured to allocate a first portion of the volatile memory device to store the first parity data, a second portion of the volatile memory device to store the second parity data, or both, based at least in part on a power state of the volatile memory device, a quantity of received write commands, a quantity of received read commands, a quantity of the first parity data stored in the volatile memory device, a quantity of the second parity data stored in the volatile memory device, or a combination thereof.

In some examples of the apparatus, the first type of failure corresponds to a first error of a word line in two or more planes in a memory die of the non-volatile memory device and the second type of failure corresponds to a second error of one or more word lines of a plane in the memory die.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
a volatile memory device;
a non-volatile memory device;
a redundant array controller of a redundant array of independent nodes associated with the non-volatile memory device; and
processing circuitry coupled with the volatile memory device, the non-volatile memory device, and the redundant array controller, the processing circuitry configured to cause the memory system to:
receive a first write command associated with writing first data to a first type of memory cell;
generate, using the redundant array controller, first parity data corresponding to the first data, the first parity data associated with the redundant array of independent nodes;
receive a second write command associated with writing second data to a second type of memory cell different than the first type of memory cell;
generate, using the redundant array controller, second parity data corresponding to the second data, the second parity data associated with the redundant array of independent nodes; and
store the second parity data in the volatile memory device coupled with the redundant array controller.

2. The memory system of claim 1, wherein:
the redundant array controller is configured to generate the first parity data to correct errors associated with a first type of failure that is associated with accessing data in the non-volatile memory device; and
the redundant array controller is configured to generate the second parity data to correct errors associated with a second type of failure that is associated with accessing data in the non-volatile memory device.

3. The memory system of claim 2, wherein the processing circuitry is further configured to cause the memory system to:
generate, using the redundant array controller, third parity data corresponding to the first data, the third parity data used to correct errors associated with the second type of failure.

4. The memory system of claim 2, wherein:
the first type of failure corresponds to a first error of a word line in two or more planes in a memory die of the non-volatile memory device; and
the second type of failure corresponds to a second error of one or more word lines of a plane in the memory die.

5. The memory system of claim 1, wherein the processing circuitry is further configured to cause the memory system to:
store the first parity data in the volatile memory device coupled with the redundant array controller until the first data is written to a page comprising memory cells of the first type of memory cell.

6. The memory system of claim 5, wherein the processing circuitry is further configured to cause the memory system to:
store the first parity data in the non-volatile memory device after writing the first data to the page.

7. The memory system of claim 1, wherein the processing circuitry is further configured to cause the memory system to:
determine that a quantity of pages in a block that store valid data satisfies a threshold, at least a portion of the block storing the second data; and
store the second parity data in the non-volatile memory device based at least in part on the determination.

8. The memory system of claim 1, wherein the processing circuitry is further configured to cause the memory system to:
allocate, in response to receiving a read command, a portion of the volatile memory device associated with storing the first parity data to store read data or to store data associated with mapping logical addresses to physical addresses.

9. The memory system of claim 1, wherein the processing circuitry is further configured to cause the memory system to:
allocate, in response to receiving the second write command to write the second data to the second type of memory cell, a portion of the volatile memory device to cache the second data, the portion of the volatile memory device associated with storing parity data that corresponds to writing data to the first type of memory cell.

10. The memory system of claim 1, wherein the processing circuitry is further configured to cause the memory system to:

allocate a first portion of the volatile memory device to store the first parity data, a second portion of the volatile memory device to store the second parity data, or both, based at least in part on a power state of the volatile memory device, a quantity of received write commands, a quantity of received read commands, a quantity of the first parity data stored in the volatile memory device, a quantity of the second parity data stored in the volatile memory device, or a combination thereof.

11. The memory system of claim 2, wherein:

the first type of memory cell is configured to store two or more bits of data; and the second type of memory cell is configured to store one bit of data.

12. The memory system of claim 1, wherein the first parity data is associated with multi-plane errors and the second parity data is associated with word line errors.

13. A memory system, comprising:

a volatile memory device;

a non-volatile memory device;

a redundant array controller of a redundant array of independent nodes associated with the non-volatile memory device; and processing circuitry coupled with the volatile memory device, the non-volatile memory device, and the redundant array controller, the processing circuitry configured to cause the memory system to:

generate, using the redundant array controller, first parity data to correct errors associated with a first type of failure that is associated with accessing data in the non-volatile memory device, the first parity data associated with the redundant array of independent nodes;

generate, using the redundant array controller, second parity data to correct errors associated with a second type of failure that is associated with accessing data in the non-volatile memory device, the second parity data associated with the redundant array of independent nodes; and store the second parity data in the volatile memory device coupled with the redundant array controller.

14. The memory system of claim 13, wherein:

the first type of failure corresponds to a first error of a word line in two or more planes in a memory die of the non-volatile memory device; and the second type of failure corresponds to a second error of one or more word lines of a plane in the memory die.

15. The memory system of claim 13, wherein the processing circuitry is further configured to cause the memory system to:

determine that a quantity of pages in a block that store valid data satisfies a threshold; and store the second parity data in the non-volatile memory device based at least in part on the determination.

16. The memory system of claim 13, wherein the processing circuitry is further configured to cause the memory system to:

allocate, in response to receiving a read command, a portion of the volatile memory device associated with storing the first parity data to store read data or to store data associated with mapping logical addresses to physical addresses.

17. The memory system of claim 13, wherein the processing circuitry is further configured to cause the memory system to:

allocate a first portion of the volatile memory device to store the first parity data, a second portion of the volatile memory device to store the second parity data, or both, based at least in part on a power state of the volatile memory device, a quantity of received write commands, a quantity of received read commands, a quantity of the first parity data stored in the volatile memory device, a quantity of the second parity data stored in the volatile memory device, or a combination thereof.

18. The memory system of claim 13, wherein:

the first type of memory cell is configured to store two or more bits of data; and the second type of memory cell is configured to store one bit of data.

19. The memory system of claim 13, wherein the first parity data is associated with multi-plane errors and the second parity data is associated with word line errors.

20. A memory system, comprising:

a non-volatile memory device;

a volatile memory device coupled with the non-volatile memory device and configured to store information associated with operating the non-volatile memory device; and a redundant array controller coupled with the volatile memory device, the redundant array controller configured to:

generate first parity data to correct errors associated with a first type of failure that is associated with accessing data in the non-volatile memory device, the first parity data associated with a redundant array of independent nodes;

generate second parity data to correct errors associated with a second type of failure that is associated with accessing data in the non-volatile memory device, the second parity data associated with the redundant array of independent nodes; and store the second parity data in the volatile memory device until a threshold quantity of pages in a block that stores first data stores valid data.

* * * * *